United States Patent [19]

Leaver

[11] 4,111,632

[45] Sep. 5, 1978

[54] PELLET MILL DIE

[75] Inventor: Richard Hazen Leaver, Muncy, Pa.

[73] Assignee: Koppers Company, Inc., Pittsburgh, Pa.

[21] Appl. No.: 808,192

[22] Filed: Jun. 20, 1977

[51] Int. Cl.[2] .................................................. B29F 3/04

[52] U.S. Cl. ................................ 425/382 R; 425/463; 425/DIG. 230

[58] Field of Search ............. 425/DIG. 230, 461, 464, 425/463, 382, 376 R, 313, 382.2, 310; 264/176 R; 72/253 R, 272

[56] References Cited

U.S. PATENT DOCUMENTS

| | | | |
|---|---|---|---|
| 3,129,458 | 4/1964 | Mitchell | 425/464 |
| 3,469,280 | 9/1969 | Mott | 425/464 X |

*Primary Examiner*—Francis S. Husar
*Assistant Examiner*—Mark Rosenbaum
*Attorney, Agent, or Firm*—Herbert J. Zeh, Jr.; Oscar B. Brumback

[57] ABSTRACT

The present invention is an improved pellet mill die having tapered grooves along each side of the compression surface of the die. The tapered grooves reduce the stresses at the maximum stress areas and thus control the breakage of metal between the first rows of holes and the inner edges of the grooves.

1 Claim, 1 Drawing Figure

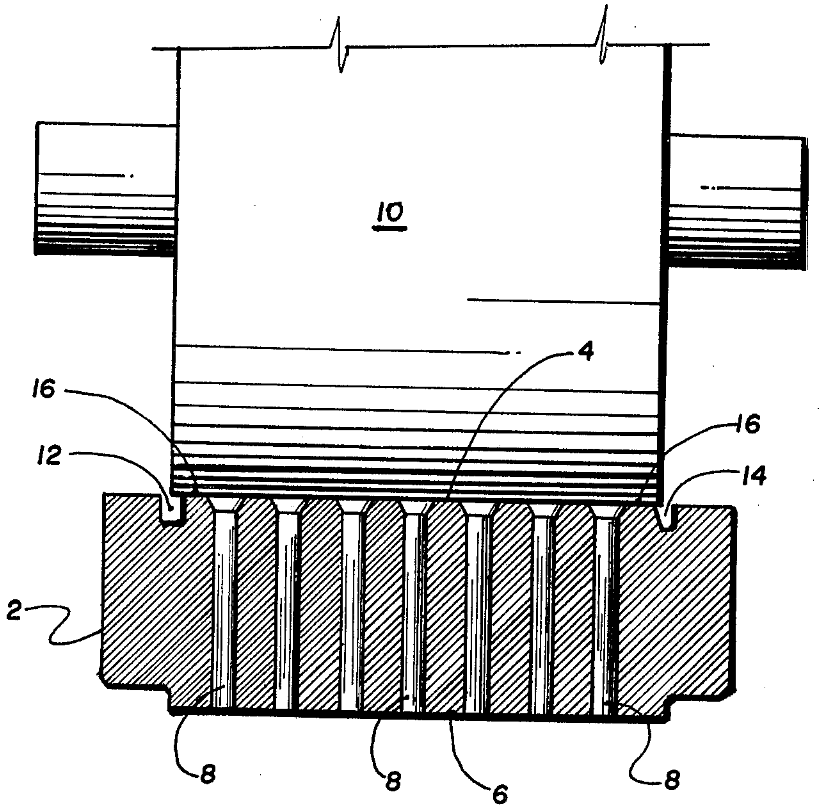
10
4
16
12
16
14
2
8
8
6
8

PELLET MILL DIE

BACKGROUND OF THE INVENTION

The present invention relates to pellet mill dies, more particularly to pellet mill dies which have tapered grooves along each side of the compression face of the die.

In pellet mills, the mixture of material to be pelleted is normally fed to a die having a plurality of extrusion holes therethrough. An extrusion means, generally one or more extrusion rolls, travels over the compression side of the die and squeezes the material between the die and the rolls. This movement forces the material through the die holes. As the material emerges from the discharge side of the die, the extrusions are severed to produce pellets.

Generally, the dies of the prior art are annular or circular in shape although they may be in the shape of a horizontal plane. The dies have a compression side and a discharge side with a plurality of die holes of suitable shape preferably arranged in rows and extending through the die from the compression side to the discharge side. When in rows, the holes will preferably be staggered with respect to holes in adjacent rows as is conventional.

In cooperation with the die are one or more extrusion rolls each of which spans the rows of die holes and traverses the compression side of the die. Material deposited on the surface of the die is extruded through the die holes and expelled from the discharge side of the die. As the extrusion rolls force the material through the holes, the compression surface of the die is worn. Since the rollers are generally wider than the die face, without some form of relief it would be necessary for the roller to grind away the area of the die outside the outer rows of die holes. This would cause severe wear of the outer edges of the rollers.

In order to overcome this problem, it has become somewhat standard practice to have grooves or channels along either side of the compression face of the die. The grooves are located along each side of the rows of die holes so that the ends of the compression rollers are positioned over the grooves. See for example, U.S. Pat. No. 3,129,458. The primary function of the grooves is to make provisions for the outer edges of the compression rollers as the die face wears. Since the distance between the outer diameter of the extrusion rollers and the die face must be maintained throughout the life of the die, the roller assembly is adjustable outwardly. Since the rollers are wider than the die face, the grooves provide a material free place for their outer edges. Without this relief it would be necessary for the rollers to physically grind away this area of the die as the die wears under normal usage. This contact stress would be quite high with resultant severe wear of the outer edges of the extrusion rollers.

Although the use of grooves has become acceptable practice and solves the problem of excessive wear of the extrusion rollers it is not without drawbacks. For example, the grooves of the prior art are U-shaped or channel shaped. Under normal wear conditions the die face wears in such a manner as to produce a ridge of metal between the outer rows of holes and the grooves which stands up and is subject to much stress. Fatigue failure can be experienced in this area of the die causing breakage along the edge of the groove. Such breakage greatly reduces the effectiveness of the outer rows of holes causing early replacement of the die.

It is the object of the present invention to provide a pellet mill die with prolonged life and reduced tendency for fatigue failure.

SUMMARY OF THE INVENTION

The present invention comprises an improved pellet mill die. The die has a compression surface and a discharge surface with a plurality of die holes extending through the die from the compression surface to the discharge surface. The die has a pair of channels or grooves formed in the compression surface. One groove or channel is on each side of the die holes. The grooves are located so that the ends of the extrusion roll or rolls extend over and end above the grooves. The inside wall of the grooves nearest the holes are tapered outwardly towards the outside wall of the grooves from the top of the groove to the bottom of the groove. The tapered grooves reduce the tendency of the metal ridges between the first rows of holes and the edges of the grooves to break off.

The improved pellet mill die of the present invention may be better understood with reference to the following drawing:

FIG. 1 is a cross section through a pellet mill die illustrating the standard prior art grooves and the tapered grooves of the present invention.

In general the problem of too much stress on the ridge of metal between the rows of die holes and channels with fatigue failure of this ridge of metal is solved in accordance with the present invention by tapering the inside wall of the channel or groove. The tapered channel inhibits breakage of the metal ridge between the rows of holes and the channel thus increasing the operating life of the die.

Referring more particularly to the drawing, there is shown a die 2 which is preferably annular or circular in shape. The die has a compression side 4 and a discharge side 6 with a plurality of circular die holes 8 preferably arranged in staggered rows and extending through the die from the compression side to the discharge side.

In cooperation with the die is one or more extrusion rolls 10 each of which spans the rows of die holes and ends over grooves 12 and 14. Groove 14 illustrates the tapered groove of the present invention while groove 12 illustrates the prior art groove.

In accordance with the present invention, the use of a tapered groove prevents breaking of the ridges of metal 16 between the last row of holes and the channels. Under normal wear conditions a great amount of stress is placed on these ridges and they have a tendency to break before the face of the die wears down near the bottom of the groove. This requires a costly premature replacement of the die. An attempt was made to reduce the breakage by increasing the size of the distance between the last rows of holes and the grooves. However, even increasing the distance did not reduce the stress enough to prevent breaking of the ridges.

It is not practical to make the ridges too large for two reasons. First, an increase in this area reduces the effective working area of the die thus reducing efficiency. Second, the wider ridges do not wear as fast as the interstices between the holes, thus, the ridge stands up as a high edge thereby prohibiting proper roll contact with the die. This can also cause accelerated wear on the outer edge of the compression rolls.

As mentioned above, the use of tapered grooves prevents the breaking of the ridges and does this without reducing the effective area of the die. The grooves are tapered outward from the top of the groove to the bottom of the groove. By tapered is meant that the width of the groove at the top is wider than the width of the groove at the bottom. The width of the groove decreases from top to bottom. However, it is not necessary that the tapered side of the groove be straight. The tapered side may take on many different profiles. For example, the tapered side may be arcuate, i.e., concave or convex. It may also be in the form of a complex curve. While it is an integral part of this invention that the inner edge of the groove be tapered outward from the top to bottom, it is optional for the outer edge of the groove to be tapered. The outer edge can be tapered in either direction and may assume any different profile. The degree of tapering and profile of inner edge of the groove is dependent upon the particular design of the die itself, the depth of the groove, and the metal composition of the die. The profile or cross section of this outer ridge is thereby more consistent with engineering principles for cantilever beam design.

I claim:

1. An improved pellet mill apparatus comprising a die having a compression side operatively associated with an extrusion roll means, said die also having a discharge side, a plurality of die holes extending through the die from the compression side to the discharge side, the die holes being arranged in rows, a pair of tapered grooves in the compression side of the die, the grooves being located along the outer row of die holes so that the ends of the extrusion roll means are positioned over the grooves.

* * * * *